US009409519B2

(12) United States Patent
Sisbot et al.

(10) Patent No.: US 9,409,519 B2
(45) Date of Patent: Aug. 9, 2016

(54) GENERATING SPATIAL INFORMATION FOR A HEADS-UP DISPLAY (71) Applicant: TOYOTA JIDOSHA KABUSHIKI KAISHA, Toyota-shi, Aichi-ken (JP)

(72) Inventors: Emrah Akin Sisbot, Mountain View, CA (US); Veeraganesh Yalla, Mountain View, CA (US)

( * ) Notice: Subject to any disclaimer, the term of this patent is extended or adjusted under 35 U.S.C. 154(b) by 84 days.

(21) Appl. No.: 14/470,849

(22) Filed: Aug. 27, 2014

(65) Prior Publication Data

US 2016/0059783 A1 Mar. 3, 2016

(51) Int. Cl.
G08G 1/00 (2006.01)
B60R 1/00 (2006.01)
G06F 3/147 (2006.01)
G02B 27/01 (2006.01)
G06T 3/20 (2006.01)

(52) U.S. Cl.
CPC ............... *B60R 1/001* (2013.01); *G02B 27/01* (2013.01); *G06F 3/147* (2013.01); *G06T 3/20* (2013.01); *B60R 2300/205* (2013.01); *B60R 2300/804* (2013.01); *B60R 2300/8093* (2013.01); *G02B 2027/0196* (2013.01); *G09G 2380/10* (2013.01)

(58) Field of Classification Search
CPC .... G01S 7/22; G01S 2013/9375; G01S 13/18
USPC ................. 340/901, 903, 905, 907, 435, 438, 340/995.19, 995.24, 988; 701/209, 210, 701/202; 348/143, 148, 164
See application file for complete search history.

(56) References Cited

U.S. PATENT DOCUMENTS 6,327,536 B1* 12/2001 Tsuji ...................... B60Q 9/008
340/435
8,669,857 B2* 3/2014 Sun ........................ B60Q 9/008
340/425.5
8,994,520 B2* 3/2015 Stahlin ................... B60K 35/00
340/436
2004/0178894 A1 9/2004 Holger et al.
2010/0073773 A1 3/2010 Hotta
2012/0259546 A1 10/2012 Kim
2015/0094118 A1* 4/2015 Rodolico ............ H04M 1/0264
455/566
2015/0246639 A1* 9/2015 Nagata ................... B60Q 9/008
340/435

FOREIGN PATENT DOCUMENTS

| EP | 1964719 A2 | 9/2008 |
|---|---|---|
| JP | 2005145434 A | 6/2005 |
| JP | 2006350934 A | 12/2006 |
| JP | 2007280203 A | 10/2007 |
| JP | 2008030729 A | 2/2008 |
| JP | 2009020675 A | 1/2009 |
| JP | 20100173619 A | 8/2010 |
| JP | 2012133699 A | 7/2012 |
| WO | 2013128615 A1 | 9/2013 |

OTHER PUBLICATIONS

Ng-Thow-Hing et al., User-Centered Perspectives for Automotive Augmented Reality, IEEE International Symposium on Mixed and Augmented Reality 2013 Arts, Media, & Humanities Proceedings, Oct. 1-4, 2013, pp. 13-22.

* cited by examiner

*Primary Examiner* — Tai Nguyen
(74) *Attorney, Agent, or Firm* — Burbage Law, P.C.; Jon-Michael Burbage; Elizabeth Ruzich (57) ABSTRACT

The disclosure includes a system and method for spatial information for a heads-up display. The system includes a processor and a memory storing instructions that, when executed, cause the system to: receive sensor data about an entity, assign the entity to a category, estimate a danger index for the entity based on vehicle data, category data, and a position of the entity, generate entity data that includes the danger index, identify a graphic that is a representation of the entity based on the entity data, determine a display modality for the graphic based on the danger index, and position the graphic to correspond to a user's eye frame.

20 Claims, 7 Drawing Sheets

GENERATING SPATIAL INFORMATION FOR A HEADS-UP DISPLAY

BACKGROUND

The specification relates to generating spatial information for a heads-up display.

Today's cars are equipped with multiple sensors, such as radar, lidar, and cameras. These sensors are often used for vehicle systems such as lane keeping, collision warning, and driving comfort systems, such as advanced cruise control. Although some vehicle systems can act according to sensor information, most safety systems require user intervention.

These vehicle systems are problematic because they require the user to look away from the road to view notifications. If the driver is in imminent danger, the time it takes to look away from the road and refocus on the notification can increase the likelihood of an accident. In addition, the notification is often presented in a way that requires further time for processing complicated information. As a result, the vehicle systems may not improve safety.

SUMMARY

According to one innovative aspect of the subject matter described in this disclosure, a system for generating spatial information for a heads-up display includes a processor and a memory storing instructions that, when executed, cause the system to: receive sensor data about an entity, assign the entity to a category, estimate a danger index for the entity based on vehicle data, category data, and a position of the entity, generate entity data that includes the danger index, identify a graphic that is a representation of the entity based on the entity data, determine a display modality for the graphic based on the danger index, and position the graphic to correspond to a user's eye frame.

In general, another innovative aspect of the subject matter described in this disclosure may be embodied in methods that include: receiving sensor data about an entity with a processor-based computing device programmed to perform the receiving, assigning the entity to a category, estimating a danger index for the entity based on vehicle data, category data, and a position of the entity, generating entity data that includes the danger index, identifying a graphic that is a representation of the entity based on the entity data, determining a display modality for the graphic based on the danger index, and positioning the graphic to correspond to a user's eye frame.

These and other embodiments may each optionally include one or more of the following operations and features. For instance, the features include: the graphic being a simplified representation of the entity; positioning the graphic corresponding to the user's eye frame further includes computing a first transformation from a sensor frame to an eye frame, multiplying the first transformation by a second transformation from graphics to the sensor frame to obtain a third transformation from the graphics to the eye frame, and projecting the graphics into a viewport placed at a transformation from graphics to an eye frame pose; the vehicle data including a current or predicted speed of the vehicle and whether the lights are on; and the category data including whether the entity is a mobile object.

In some embodiments, the operations can include: displaying the graphic as three-dimensional Cartesian coordinates on a heads-up display, determining a position of the entity in a sensor frame, a bounding box of the entity, and a type of entity, determining whether the danger index exceeds a predetermined threshold probability, and determining a more noticeable display modality responsive to an increasing danger index.

Other aspects include corresponding methods, systems, apparatus, and computer program products for these and other innovative aspects.

The disclosure is particularly advantageous in a number of respects. For example, the system can alert users to dangerous situations with graphics that are easy to understand. In addition, the heads-up display generates graphics that do not require the driver to change focus to switch between viewing the road and the graph. As a result, the user can react more quickly and possibly avoid a collision.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System Overview

Figure 1:
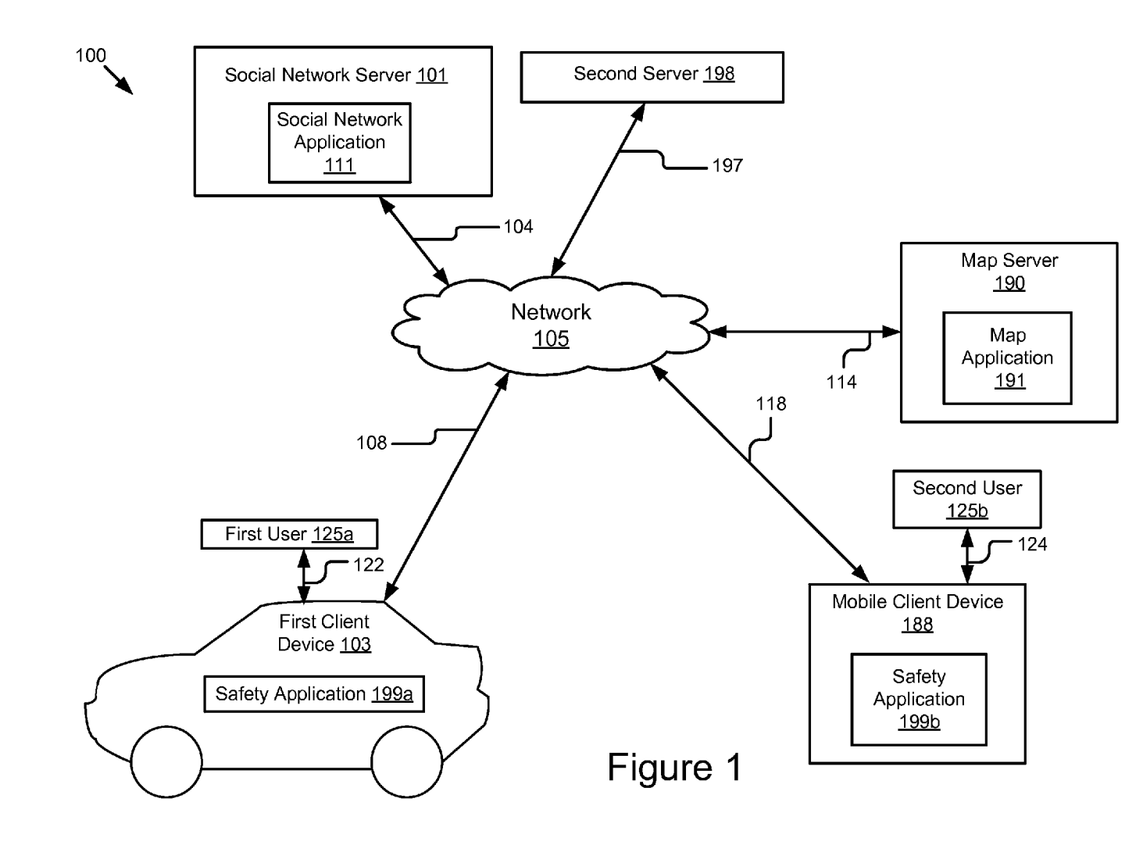
FIG. 1 is a block diagram illustrating an example system for generating spatial information for a heads-up display.

FIG. 1 illustrates a block diagram of one embodiment of a system 100 for generating spatial information for a heads-up display. The system 100 includes a first client device 103, a mobile client device 188, a social network server 101, a second server 198, and a map server 190. The first client device 103 and the mobile client device 188 can be accessed by users 125a and 125b (also referred to herein individually and collectively as user 125), via signal lines 122 and 124, respectively. In the illustrated embodiment, these entities of the system 100 may be communicatively coupled via a network 105. The system 100 may include other servers or devices not shown in FIG. 1 including, for example, a traffic server for providing traffic data, a weather server for providing weather data, and a power service server for providing power usage service (e.g., billing service).

The first client device 103 and the mobile client device 188 in FIG. 1 can be used by way of example. While FIG. 1 illustrates two client devices 103 and 188, the disclosure applies to a system architecture having one or more client devices 103, 188. Furthermore, although FIG. 1 illustrates one network 105 coupled to the first client device 103, the mobile client device 188, the social network server 101, the second server 198, and the map server 190, in practice one or more networks 105 can be connected. While FIG. 1 includes one social network server 101, one second server 198, and one map server 190, the system 100 could include one or more social network servers 101, one or more second servers 198, and one or more map servers 190.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 105 may include a GPS satellite for providing GPS navigation to the first client device 103 or the mobile client device 188. In some embodiments, the network 105 may include a GPS satellite for providing GPS navigation to the first client device 103 or the mobile client device 188. The network 105 may be a mobile data network such as 3G, 4G, LTE, Voice-over-LTE ("VoLTE"), or any other mobile data network or combination of mobile data networks.

In some embodiments, a safety application 199a can be operable on the first client device 103. The first client device 103 can be a mobile client device with a battery system. For example, the first client device 103 can be one of a vehicle (e.g., an automobile, a bus), a bionic implant, or any other mobile system including non-transitory computer electronics and a battery system. In some embodiments, the first client device 103 may include a computing device that includes a memory and a processor. In the illustrated embodiment, the first client device 103 is communicatively coupled to the network 105 via signal line 108.

In other embodiments, a safety application 199b can be operable on the mobile client device 188. The mobile client device 188 may be a portable computing device that includes a memory and a processor, for example, an in-dash car device, a laptop computer, a tablet computer, a mobile telephone, a personal digital assistant ("PDA"), a mobile e-mail device, a portable game player, a portable music player, or other portable electronic device capable of accessing the network 105. In some embodiments, the safety application 199b may act in part as a thin-client application that may be stored on the first client device 103 and in part as components that may be stored on the mobile client device 188. In the illustrated embodiment, the mobile client device 188 is communicatively coupled to the network 105 via a signal line 118.

In some embodiments, the first user 125a and the second user 125b can be the same user 125 interacting with both the first client device 103 and the mobile client device 188. For example, the user 125 can be a driver sitting in the first client device 103 (e.g., a vehicle) and operating the mobile client device 188 (e.g., a smartphone). In some other embodiments, the first user 125a and the second user 125b may be different users 125 that interact with the first client device 103 and the mobile client device 188, respectively. For example, the first user 125a could be a drive that drives the first client device 103 and the second user 125b could be a passenger that interacts with the mobile client device 188.

The safety application 199 can be software for generating spatial information for a heads-up display. The safety application 199 receives sensor data about an entity. For example, the safety application 199 receives information about the entity's position and characteristics. The safety application 199 assigns the entity to a category. For example, the category is pedestrian or, more generally, a mobile object. The safety application 199 estimates a danger index for the entity based on vehicle data, category data, and a position of the entity. For example, where the entity is a pedestrian that begins walking across a road that the vehicle is travelling on, the danger index reflects a probability of a collision occurring if the vehicle travels at the same speed. The safety application generates entity data that includes the danger index. For example, the safety application determines that the entity is a pedestrian and, based on the danger index, the probability of a collision is high. The safety application identifies a graphic that is a representation of the entity based on the entity data. For example, the graphic could be a stick figure version of a pedestrian. The safety application determines a display modality for the graphic based on the danger index. For example, where the pedestrian is close to the vehicle, the modality is a flashing red border around the stick figure. The safety application 199 positions the graphic to correspond to a user's eye frame. As a result, the user can view the graphic without having to refocus to see the graphic.

In some embodiments, the safety application 199 can be implemented using hardware including a field-programmable gate array ("FPGA") or an application-specific integrated circuit ("ASIC"). In some other embodiments, the safety application 199 can be implemented using a combination of hardware and software. The safety application 199 may be stored in a combination of the devices and servers, or in one of the devices or servers.

The social network server 101 can be a hardware server that includes a processor, a memory, and network communication capabilities. In the illustrated embodiment, the social network server 101 is coupled to the network 105 via a signal line 104. The social network server 101 sends and receives data to and from other entities of the system 100 via the network 105. The social network server 101 includes a social network application 111. A social network can be a type of social structure where the user 125 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

In some embodiments, the social network application 111 generates a social network that may be used for generating entity data. For example, other vehicles could be travelling a similar path as the first client device 103 and could identify information about entities that the first client device 103 is going to encounter. For example, where the entity is a pedestrian, the other vehicle could determine the speed and direction of the pedestrian. That entity data can be used by the safety application 199 to more accurately determine a danger index for the pedestrian.

The map server 190 can be a hardware server that includes a processor, a memory, and network communication capabilities. In the illustrated embodiment, the map server 190 is coupled to the network 105 via a signal line 114. The map server 190 sends and receives data to and from other entities of the system 100 via the network 105. The map server 190 includes a map application 191. The map application 191 may generate a map and directions for the user. In one embodiment, the safety application 199 receives a request for directions from the user 125 to travel from point A to point B and transmits the request to the map server 190. The map application 191 generates directions and a map and transmits the directions and map to the safety application 199 for display to the user. In some embodiments, the safety application 199 adds the directions to the vehicle data 293 because the directions can be used to determine the path of the first mobile device 103.

In some embodiments, the system 100 includes a second sever 198 that is coupled to the network via signal line 197. The second server 198 may store additional information that is used by the safety application 199, such as infotainment, music, etc. In some embodiments, the second server 198 receives a request for data from the safety application 199 (e.g., data for streaming a movie, music, etc.), generates the data, and transmits the data to the safety application 199.

Example Map Application

Figure 2:
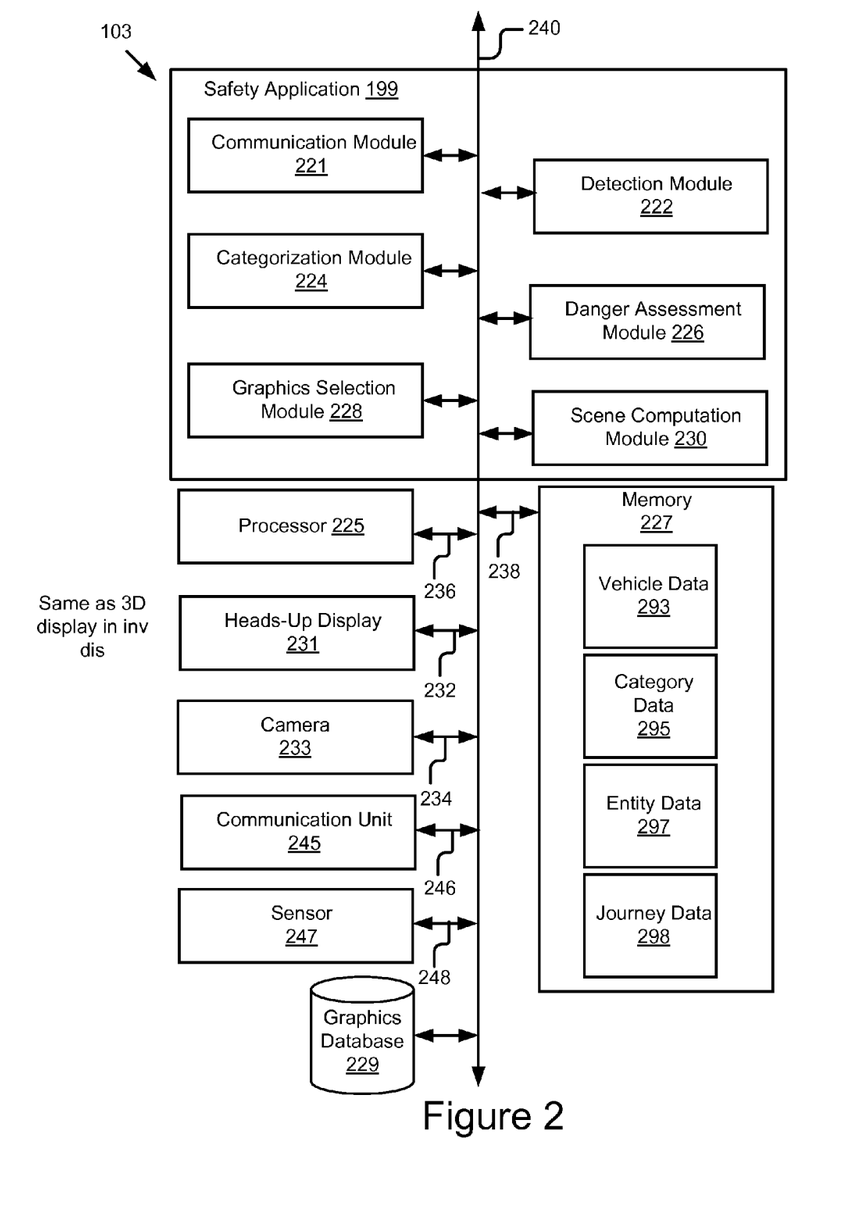
FIG. 2 is a block diagram illustrating an example safety application for generating spatial information.

Referring now to FIG. 2, an example of the safety application 199 is shown in more detail. FIG. 2 is a block diagram of a first client device 103 that includes the safety application 199, a processor 225, a memory 227, a graphics database 229, a heads-up display 231, a camera 233, a communication unit 245, and a sensor 247 according to some examples. The components of the computing device 200 are communicatively coupled by a bus 240.

Although FIG. 2 includes the safety application 199 being stored on the first client device 103, persons of ordinary skill in the art will recognize that some of the components the safety application 199 can be stored on the mobile client device 188 where certain hardware would not be applicable. For example, the mobile client device 188 would not include the heads-up display 231 or the camera 233. In embodiments where the safety application 199 is stored on the mobile client device 188, the safety application 199 may receive information from the sensors on the first client device 103 and use the information to determine the graphic for the heads-up display 231, and transmit the graphic to the heads-up display 231 on the first client device 103. In some embodiments, the safety application 199 can be stored in part on the first client device 103 and in part on the mobile client device 188.

The processor 225 includes an arithmetic logic unit, a microprocessor, a general-purpose controller, or some other processor array to perform computations and provide electronic display signals to a display device. The processor 225 is coupled to the bus 240 for communication with the other components via a signal line 236. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 240 for communication with the other components via a signal line 238. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores vehicle data 293, category data 295, entity data 297, and journey data 298. The vehicle data 293 includes information about the first client device 103, such as the speed of the vehicle, whether the vehicle's lights are on or off, the intended route of the vehicle as provided by map server 190 or another application. In some embodiments, the sensor 247 may include hardware for determining vehicle data 293. The vehicle data 293 is used by the danger assessment module 226 to determine a danger index for the entity.

The category data 295 includes different categories for entities and information about how entities in each category behave. For example, the categories may be broad categories of stationary objects and moving objects, or more specific categories, such as stationary human, moving human, stationary vehicle, moving vehicle, etc. It can be traffic signs, road related objects, informational objects, etc. For example, the category data 295 for a vehicle can include a minimum speed, a maximum speed, and an average speed that are each updated when new vehicle information is identified. The category data 295 is used by the danger assessment module 226 to determine a danger index for the entity.

The entity data 297 includes information about the entity. For example, the entity data 297 includes a position and an orientation of the entity in a sensor frame, a bounding box of the entity, a direction of the motion of the entity and its speed. In some embodiments, the entity data 297 also includes historical data about how entities behave.

The journey data 298 includes information about the user's journey, such as start points, destinations, durations, routes associated with historical journeys, etc. For example, the journey data 298 could include a log of all locations visited by the first client device 103, all locations visited by the user 125 (e.g., locations associated with both the first client device 103 and the mobile client device 188), locations requested by the user 125, etc.

The graphics database 229 includes a database for storing graphics information. The graphics database 229 contains a set of pre-constructed two-dimensional and three-dimensional graphics that represent different entities. For example, the two-dimensional graphic may be a 2D pixel matrix, and the three-dimensional graphic may be a 3D voxel matrix. The graphics may be simplified representations of entities to decrease cognitive load on the user. For example, instead of representing a pedestrian as a realistic rendering, the graphic of the pedestrian includes a walking stick figure. In some embodiments, the graphics database 229 is a relational database that responds to queries. For example, the graphics selection module 228 queries the graphics database 229 for graphics that match the entity data 297.

The heads-up display 231 includes hardware for displaying three-dimensional (3D) graphical data in front of a user such that they do not need to look away from the road to view the graphical data. For example, the heads-up display 231 may include a physical screen or it may project the graphical data onto a transparent film that is part of the windshield of the first client device 103 or part of a reflector lens. In some embodiments, the heads-up display 231 is included as part of the first client device 103 during the manufacturing process or is later installed. In other embodiments, the heads-up display 231 is a removable device. In some embodiments, the graphical data adjusts a level of brightness to account for environmental conditions, such as night, day, cloudy, brightness, etc. The heads-up display is coupled to the bus 240 via signal line 232.

The heads-up display 231 receives graphical data for display from the safety application 199. For example, the heads-up display 231 receives a graphic of a car from the safety application 199 with a transparent modality. The heads-up display 231 displays graphics as three-dimensional Cartesian coordinates (e.g., with x, y, z dimensions).

The camera 233 is hardware for capturing images outside of the first client device 103 that are used by the detection module 222 to identify entities. In some embodiments, the camera 233 captures video recordings of the road. The camera 233 may be inside the first client device 103 or on the exterior of the first client device 103. In some embodiments, the camera 233 is positioned in the front part of the car and records entities on or near the road. For example, the camera 233 is positioned to record everything that the user can see. The camera 233 transmits the images to the safety application 199. Although only one camera 233 is illustrated, multiple cameras 233 may be used. In embodiments where multiple cameras 233 are used, the cameras 233 may be positioned to maximize the views of the road. For example, the cameras 233 could be positioned on each side of the grill. The camera is coupled to the bus 240 via signal line 234.

The communication unit 245 transmits and receives data to and from at least one of the first client device 103 and the mobile client device 188, depending upon where the safety application 199 is stored. The communication unit 245 is coupled to the bus 240 via a signal line 246. In some embodiments, the communication unit 245 includes a port for direct physical connection to the network 105 or to another communication channel. For example, the communication unit 245 includes a USB, SD, CAT-5, or similar port for wired communication with the first client device 103. In some embodiments, the communication unit 245 includes a wireless transceiver for exchanging data with the first client device 103 or other communication channels using one or more wireless communication methods, including IEEE 802.11, IEEE 802.16, BLUETOOTH®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The sensor 247 is any device that senses physical changes. The first client device 103 may have one type of sensor 247 or many types of sensors. The sensor 247 is coupled to the bus 220 via signal line 248.

In one embodiment, the sensor 247 includes a laser-powered sensor, such as light detection and ranging (lidar) that are used to generate a three-dimensional map of the environment surrounding the first client device 103. Lidar functions as the eyes of the first client device 103 by shooting bursts of energy at a target from lasers and measuring the return time to calculate the distance. In another embodiment, the sensor 247 includes radar, which functions similar to lidar but uses microwave pulses to determine the distance and can detect smaller objects at longer distances.

In another embodiment, the sensor 247 includes hardware for determining vehicle data 293 about the first client device 103. For example, the sensor 247 is a motion detector, such as an accelerometer that is used to measure acceleration of the first client device 103. In another example, the sensor 247 includes location detection, such as a global positioning system (GPS), location detection through triangulation via a wireless network, etc. In yet another example, the sensor 247 includes hardware for determining the status of the first client device 103, such as hardware for determining whether the lights are on or off, whether the windshield wipers are on or off, etc. In some embodiments, the sensor 247 transmits the vehicle data 293 to the detection module 222 or the danger assessment module 226 via the communication module 202. In other embodiments, the sensor 247 stores the location information as part of the vehicle data 293 in the memory 227.

In some embodiments, the sensor 247 may include a depth sensor. The depth sensor determines depth using structured light, such as a speckle pattern of infrared laser light. In another embodiment, the depth sensor determines depth using time-of-flight technology that determines depth based on the time it takes a light signal to travel between the camera 233 and an object. For example, the depth sensor is a laser rangefinder. The depth sensor transmits the depth information to the detection module 222 via the communication module 202 or the sensor 247 stores the depth information as part of the vehicle data 293 in the memory 227.

In other embodiments, the sensor 247 may include an infrared detector, a motion detector, a thermostat, a sound detector, and any other type of sensors. For example, the first client device 103 may include sensors for measuring one or more of a current time, a location (e.g., a latitude, longitude, and altitude of a location), an acceleration of a vehicle, a velocity of a vehicle, a fuel tank level, and a battery level of a vehicle, etc. The sensors can be used to create vehicle data 293. The vehicle data 293 can also include any information obtained during travel or received from the social network server 101, the second server 198, the map server 190, or the mobile client device 188.

Example Safety Application

In some embodiments, the safety application 199 includes a communication module 221, the object detector 222, a categorization module 224, a danger assessment module 226, a graphics selection module 228, and a scene computation module 230.

The communication module 221 can be software including routines for handling communications between the safety application 199 and other components of the first client device 103. In some embodiments, the communication module 221 can be a set of instructions executable by the processor 235 to provide the functionality described below for handling communications between the safety application 199 and other components of the first client device 103. In some embodiments, the communication module 221 can be stored in the memory 237 of the first client device 103 and can be accessible and executable by the processor 235.

The communication module 221 sends and receives data, via the communication unit 245, to and from one or more of the first client device 103, the mobile client device 188, the map server 190, the social network server 101, and the second server 198 depending upon where the safety application 199 is stored. For example, the communication module 221 receives, via the communication unit 245, map data from the map server 190 about the intended path for the first client device 103. The communication module 221 sends the map data to the danger assessment module 226 for comparing the first mobile device's 103 path to the path of any detected entities.

In some embodiments, the communication module 221 receives data from components of the safety application 199 and stores the data in the memory 237. For example, the communication module 221 receives data from the sensors 247, and stores it as vehicle data 293 in the memory 237 as determined by the detection module 222.

In some embodiments, the communication module 221 may handle communications between components of the safety application 199. For example, the communication module 221 receives category data 295 from the categorization module 224 and transmits it to the danger assessment module 226.

The detection module 222 can be software including routines for receiving data from the sensor 247 about an entity. In some embodiments, the detection module 222 can be a set of instructions executable by the processor 235 to provide the functionality described below for receiving sensor data from the sensor 247. In some embodiments, the detection module 222 can be stored in the memory 237 of the first client device 103 and can be accessible and executable by the processor 235.

In some embodiments, the detection module 222 receives sensor data from at least one of the sensor 247 or the camera 233 and generates entity data 297 about the entities. For example, the detection module 222 determines the position of the entity relative to the sensor 247 or camera 233. In another example, the detection module 222 receives images or video from the camera 233 and identifies the location of entities, such as pedestrians or stationary objects including buildings, lane markers, obstacles, etc.

The detection module 222 can use vehicle data 293 generated from the sensor 247, such as a location determined by GPS, to determine the distance between the entity and the first client device 103. In another example, the sensor 247 includes lidar or radar that can be used to determine the distance between the first client device 103 and the entity. The detection module 222 returns an n-tuple containing the position of the entity in a sensor frame $(x, y, z)_s$. In some embodiments, the detection module 222 uses the position information to determine a path for the entity. The detection module 222 adds the path to the entity data 297.

The detection module 222 may receive information from the social network server 101 about the entity. For example, where a first client device 103 detects the entity before another first client device 103 travels on the same or similar path, the social network server 101 may transmit information to the safety application 199 about the entity. For example, the detection module 222 may receive information about the speed of the entity from the social network server 101.

In some embodiments, the detection module 222 determines the spatial position of the entity and generates a bounding box that surrounds the entity. For example, the detection module 222 may generate a bounding box in the shape of a cylinder. Other bounding box shapes are possible including an irregularly shaped bounding box to account for asymmetrical objects. In some embodiments, the detection module 222 returns an n-tuple containing the position of the bounding box of the entity $(x_b, y_b, z_b)_s$ where coordinate$_b$ represents the coordinate for the bounding box relative to the sensor (s).

In some embodiments, the detection module 222 determines a type of entity. For example, the detection module 222 determines that the entity is a particular object, unknown obstacle, a person, a biker, a vehicle, a specific traffic signal, lane marker, a commercial sign, etc. In some embodiments, the detection module 222 outputs the type as part of the n-tuple. For example, the detection module 222 outputs the position of the entity in the sensor frame, the bounding box of the entity, and the type as $[(x, y, z)_s, (x_b, y_b, z_b)_s, T]$.

Figure 3A:
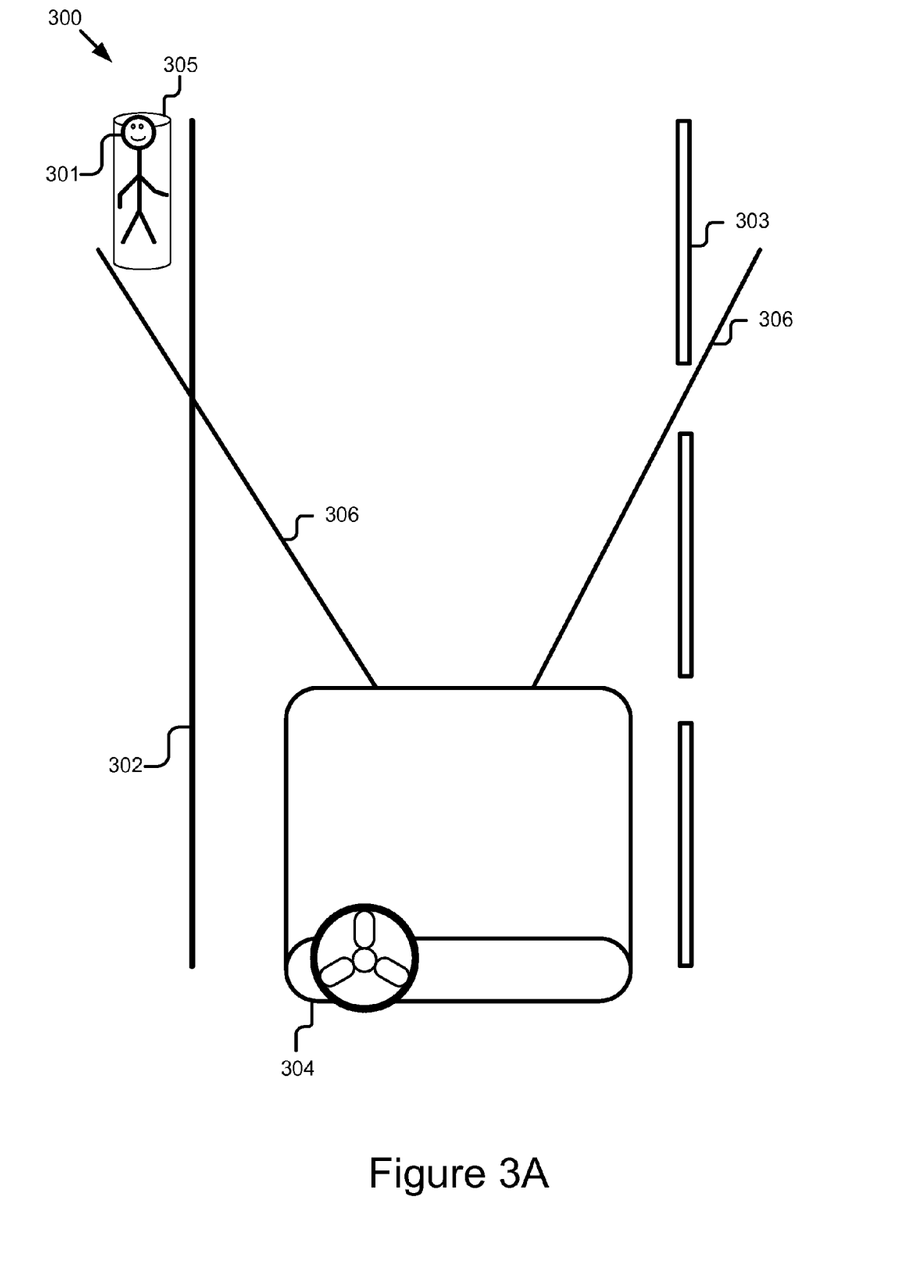
FIG. 3A is a graphic representation of an example bounding box surrounding an entity.

FIG. 3A is a graphic representation 300 of a roadway with a person 301 crossing a street. The sensor 247 and/or camera 233 capture information about the roadway and transmit the information to the detection module 222. The lines 306 emanating from the dashboard 304 of the first client device 103 represent the portion of the roadway captured by the sensor 247 and/or camera 233.

The detection module 222 detects the person 301, the sidewalk 302, and the lane markers 303. The detection module 222 generates entity data 297 for the person 301, the sidewalk 302, and the lane markers 303. The detection module 222 generates a bounding box 305 that surrounds the pedestrian 301. In this example, the bounding box is a cylinder.

The categorization module 224 can be software including routines for categorizing the entity. In some embodiments, the categorization module 224 can be a set of instructions executable by the processor 235 to provide the functionality described below for categorizing the entity. In some embodiments, the categorization module 224 can be stored in the memory 237 of the first client device 103 and can be accessible and executable by the processor 235.

The categorization module 224 generates categories for entities and stores the categories as category data 295. The categorization module 224 receives the entity data 297 from the detection module 222 or retrieves the entity data 297 from memory 227. The categorization module 224 determines a category for the entity and adds the information to the entity data 297 for the entity. For example, the categorization module 224 may categorize a person as a stationary person or a pedestrian. Other categories may include traffic information, moving vehicles, etc. For each category, the categorization module 224 may add information about average speed, predictability of movement, average dimensions for the category, etc. In some embodiments, the categorization module 224 appends the category to the entity information as $[(x, y, z)_s, (x_b, y_b, z_b)_s, T, C]$.

Figure 3B:
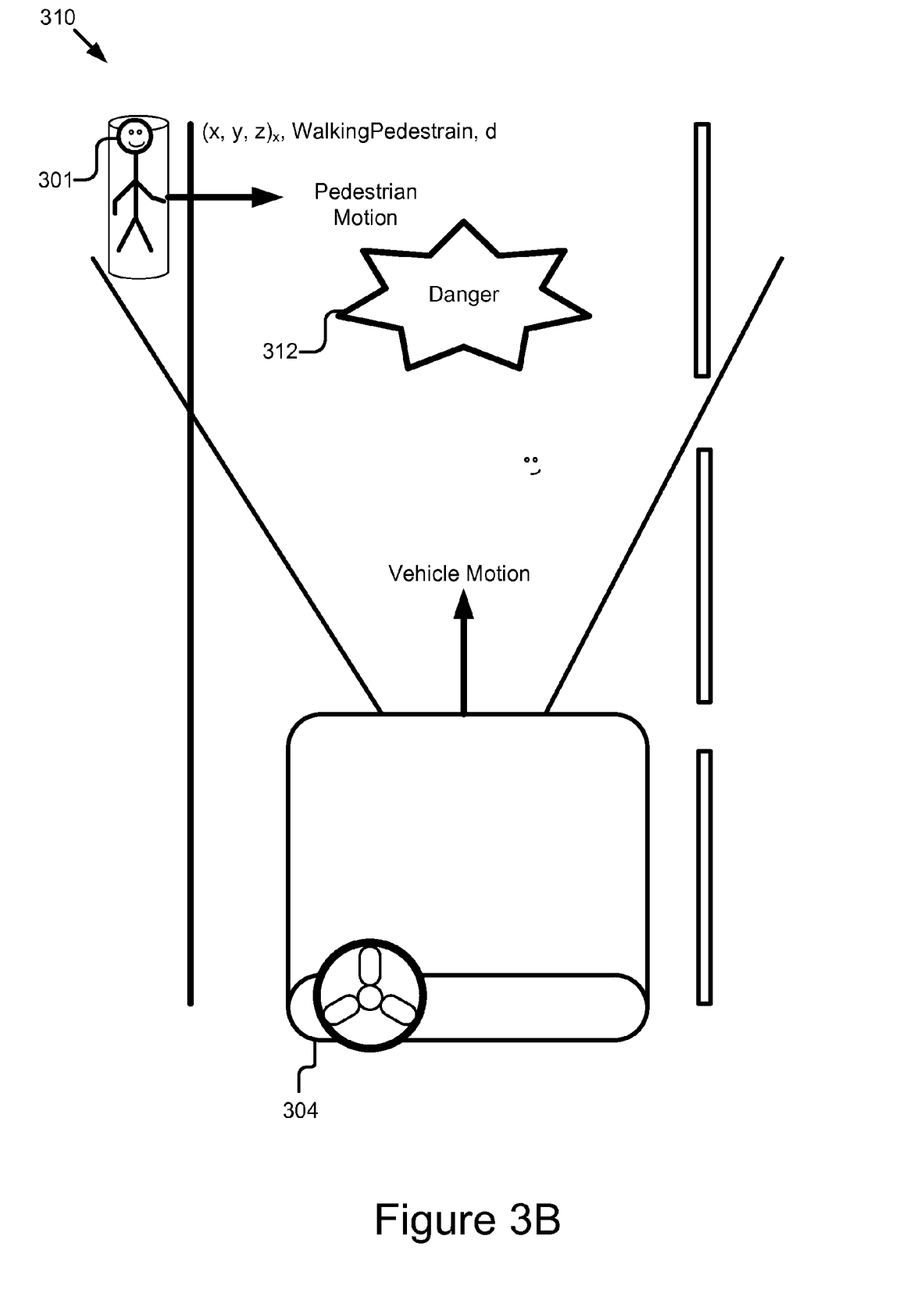
FIG. 3B is a graphic representation of an example categorized entity with a determined danger index.

FIG. 3B is a graphic representation 310 of an example categorized entity with a determined danger index. The categorization module 224 categorizes the person 301 as a pedestrian and a walking entity.

The danger assessment module 226 can be software including routines for estimating a danger index for the entity based on vehicle data 293, category data 295, and entity data 297. In some embodiments, the danger assessment module 226 can be a set of instructions executable by the processor 235 to provide the functionality described below for estimating a danger index for the entity. In some embodiments, the danger assessment module 226 can be stored in the memory 237 of the first client device 103 and can be accessible and executable by the processor 235.

In some embodiments, the danger assessment module 226 estimates a danger index for an entity based on vehicle data 293, category data 295, and entity data 297. For example, the danger assessment module 226 determines the speed of the first client device 103, whether the entity is part of a category that moves based on the category data 295, and how close the first client device 103 is to the entity. Where the entity is also moving, the danger assessment module 226 may determine a path of the entity and a speed of the entity to determine whether a collision may occur and how soon the collision may occur based on the speed of the first client device 103 and the entity.

In some embodiments, the category data 295 includes historical information about the entity's movement, which the danger assessment module 226 takes into account. In some other embodiments, the danger index is based on the condition of the first client device 103. For example, if the first client device's 103 windshield wipers are on, the danger assessment module 226 may assign a higher danger index because the windshield wipers suggest poor weather conditions. In some embodiments, the danger assessment module 226 also uses a predicted path for the entity as a factor in determining the danger index.

The danger index may be probabilistic and reflect a likelihood of collision. For example, the danger index may be calculated as $d/d_{max}$ where $d_{max}$ is a 100. A score of 51/100 would reflect a 51% chance of collision. In some embodiments, the danger assessment module 226 uses a weighted calculation to determine the danger index. For example, the danger assessment module 226 uses the following combination of information:

$$d = f(w_1(\text{speed of vehicle}), w_2(\text{weather conditions}), w_3(\text{category data}), w_4(\text{entity data})) \quad (1)$$

where $w_1$ is a first weight, $w_2$ is a second weight, $w_3$ is a third weight, and $w_4$ is a fourth weight. The danger index can be computed analyzing the vehicle's and the entity's directions to decide whether they intersect. If their estimated paths intersect then the system can look into their velocities to decide whether there is a collision risk, and whether the vehicle can stop given the road and weather conditions.

In some embodiments, the danger assessment module 226 divides the danger index into different levels, such as 0-40% being no threat, 41%-60% being moderate threat, 61%-80% being serious threat, and 81%-100% being imminent collision. As a result, if the danger index falls into certain categories, the danger assessment module 226 provides the danger index and the level to the graphics selection module 228 so that the graphics selection module 228 uses a corresponding modality. In some embodiments, the danger assessment module 226 adds the danger index to the entity data 297 as $[(x, y, z)_s, (x_b, y_b, z_b)_s, T, C, d/d_{max}]$.

Continuing with the description of FIG. 3B, the danger assessment module 226 calculates a danger index that reflects a collision risk based on the walking pedestrian's 301 movement and the path of the first client device 103. In this example, the danger assessment module 226 determines a danger index indicating a high likelihood of collision between the pedestrian 301 and the first client device 103 as represented by the danger icon 312. As a result, the danger assessment module 226 transmits the danger index to the graphics selection module 228 and/or adds the danger index to the entity data 297 stored in the memory.

The graphics selection module 228 can be software including routines for selecting a graphic and a modality to represent the entity. In some embodiments, the graphics selection module 228 can be a set of instructions executable by the processor 235 to provide the functionality described below for selecting the graphic and the modality to represent the entity. In some embodiments, the graphics selection module 228 can be stored in the memory 237 of the first client device 103 and can be accessible and executable by the processor 235.

In some embodiments, the graphics selection module 228 queries the graphics database 229 for a matching graphic. In some embodiments, the graphics selection module 228 provides an identification of the entity as determined by the detection module 222. For example, the graphics selection module 228 queries the graphics database 229 for a graphic of a bus. In another embodiment, the graphics selection module 228 queries the graphics database 229 based on multiple attributes, such as a mobile vehicle with eighteen tires.

In some embodiments, the graphics selection module 228 requests a modality where the modality is based on the danger index. The modality may be part of the graphic for the entity or a separate graphic. The modality reflects the risk associated with the entity. For example, the graphics selection module 228 may request a flashing red outline for the entity if the danger is imminent. Conversely, the graphics selection module 228 may request a transparent image of the entity if the danger is not imminent. In some embodiments, the modality corresponds to the danger levels determined by the danger assessment module 226. For example, 0-40% corresponds to a transparent modality, 41%-60% corresponds to an orange modality, 61%-80% corresponds to a red and flashing modality, and 81%-100% corresponds to a solid red flashing modality.

In some embodiments, the graphics selection module 228 determines the modality based on the position of the entity. For example, where the entity is a pedestrian walking on a sidewalk along the road, the graphics selection module 228 determines that the modality is a light graphic. The graphics selection module 228 retrieves the graphic $G_g$ from the graphics database 229.

Figure 3C:
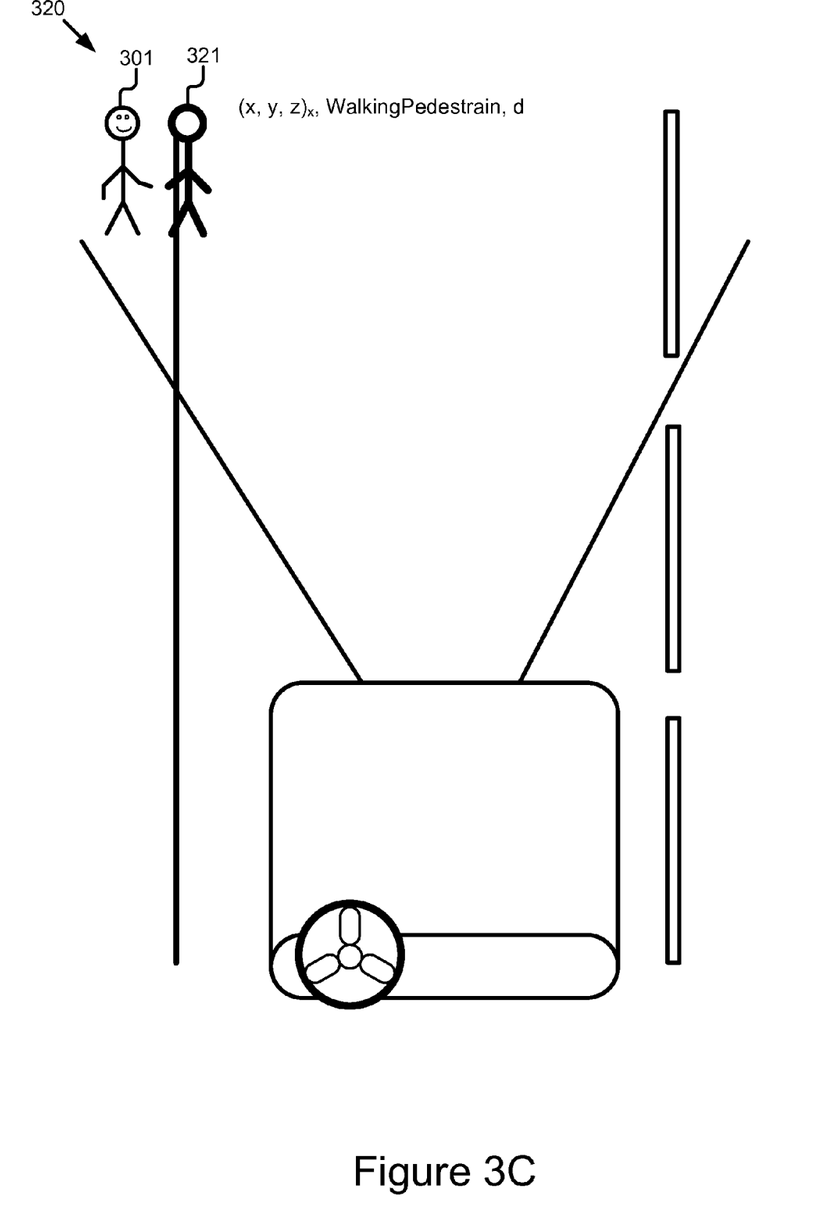
FIG. 3C is a graphic representation example of a graphic selection process.

FIG. 3C a graphic representation 320 example of a graphic selection process. In this example, the graphics selection module 228 selects a graphic 321 that is a simplified version of the pedestrian. This is illustrated with a stick figure instead of a pedestrian with bent arms and a face. In some embodiments, the graphic 321 could include a bright red modality to convey the significance of the graphic.

The scene computation module 230 can be software including routines for positioning the graphic to correspond to a user's eye frame. In some embodiments, the scene computation module 230 can be a set of instructions executable by the processor 235 to position the graphic to correspond to the user's eye frame. In some embodiments, the scene computation module 230 can be stored in the memory 237 of the first client device 103 and can be accessible and executable by the processor 235.

In one embodiment, scene computation module 230 transforms the graphic and the modality to the driver's eye box. The eye box is an area with a projected image generated by the heads-up display 231 that is within the driver's field of view. The eye box frame is designed to be large enough that the driver can move his or her head and still see the graphics. If the driver's eyes are too far left or right of the eye box, the graphics will disappear off the edge. Because the eye box is within the driver's field of vision, the driver does not need to refocus in order to view the graphics. In some embodiments, the scene computation module 230 generates a different eye box for each user during calibration to account for variations in height and interocular distance (i.e. distance between the eyes of the driver).

The scene computation module 230 adjusts the graphics to the view of the driver and to the distance between the sensor and the driver's eye box. In one embodiment, the scene computation module 230 computes the graphics in the eye frame $G_{eye}$ based on the spatial position relative to the first client device 103 $(x, y, z)_s$ and the graphics $G_g$. First the transformation from the sensor frame to the eye frame ($T_{s-e}$) is computed. Then the scene computation module 230 multiplies the $T_{s-e}$ by the transformation from graphics to sensor frame ($T_{g-s}$), resulting in the transformation from graphics to eye frame ($T_{g-e}$). Then the graphics $G_g$ are projected into a viewport placed at a $T_{g-e}$ pose. The scene computation module 230 computes the eye frame so that the driver does not have to refocus when switching the gaze between the road and the graphics. As a result, displaying graphics that keep the same focus for the driver may save between 0.5 and 1 second in reaction time, which for a first client device 103 is travelling at 90 km/h, results in 12.5 to 25 meters further to react to an entity.

In some embodiments, the scene computation module 230 generates instructions for the heads-up display 231 to superimpose the graphics on the location of the entity. In another embodiment, the scene computation module 230 generates instructions for the heads-up display 231 to display the graphics in another location, or in addition to superimposing the graphics on the real entity. For example, the bottom or top of the heads-up display image could contain a summary of the graphics that the user should be looking for on the road.

In some embodiments, the scene computation module 230 determines the field of view for each eye to provide binocular vision. For example, the scene computation module 230 determines an overlapping binocular field of view, which is the maximum angular extent of the heads-up display 231 that is visible to both eyes simultaneously. In some embodiments, the scene computation module 230 calibrates the binocular FOV for each driver to account for variations in interocular distance and driver height.

Figure 3D:
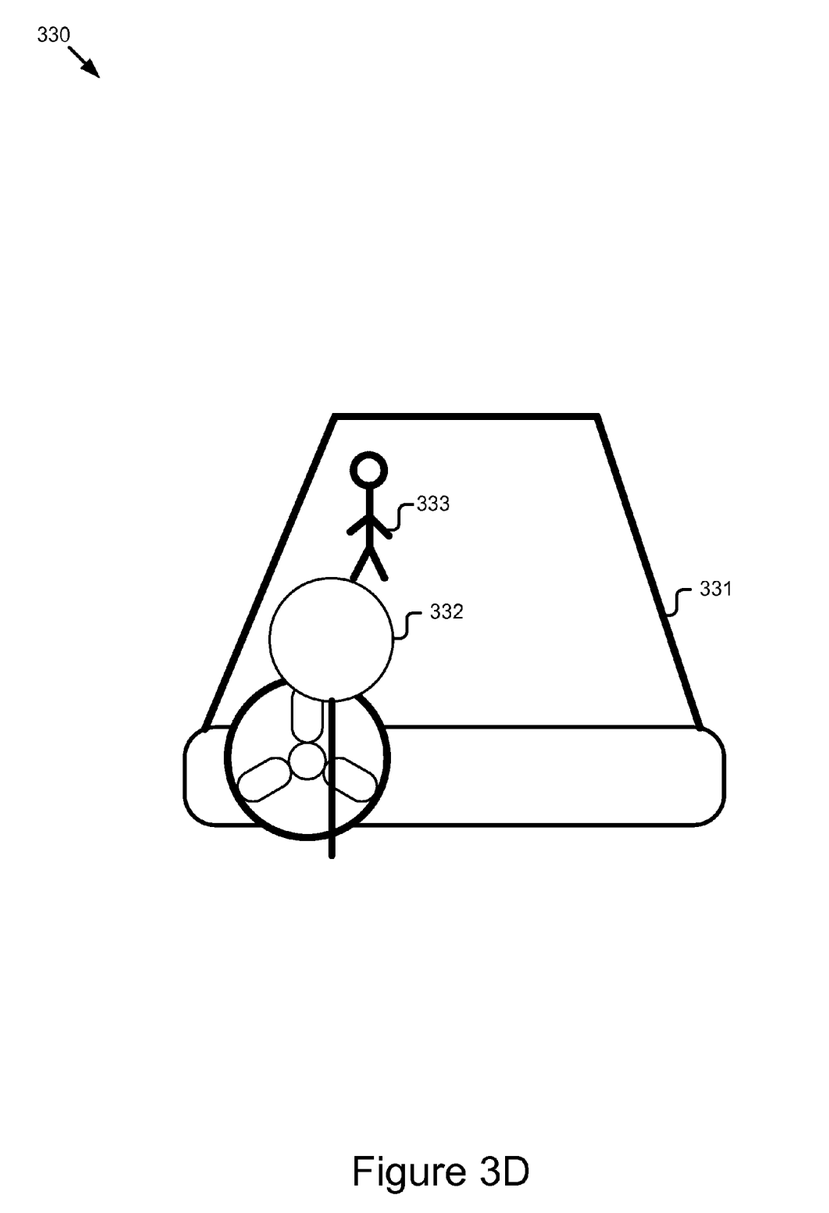
FIG. 3D is a graphic representation example of a heads-up display.

FIG. 3D is a graphic representation 330 example of a heads-up display 331. In this example, the scene computation module 230 computes the eye frame 332 based on the spatial position relative to the first client device 103 $(x, y, z)_s$ and generates a projected image into the eye position with embedded range information. As a result, the scene computation module 230 places the graphic 333 in 3D without requiring the driver's eyes to refocus.

Example Method

Figure 4:
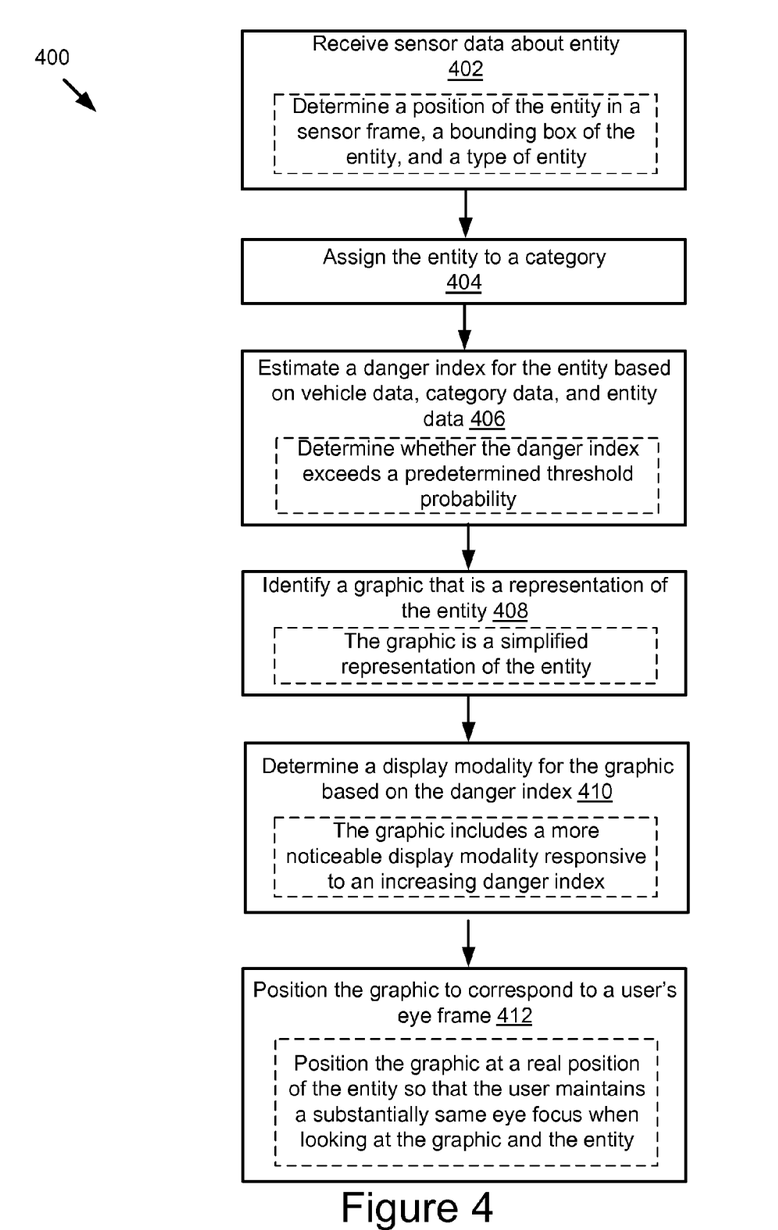
FIG. 4 is a flowchart of an example method for generating spatial information for a heads-up display.

FIG. 4 is a flowchart of an example method for generating spatial information for a heads-up display. In some embodiments, the method 400 may be performed by modules of the safety application 199 stored on the first client device 103 or the mobile client device 188. For example, the safety system 199 may include a detection module 222, the categorization module 224, the danger assessment module 226, the graphics selection module 228, and the scene computation module 230.

The detection module 222 receives 402 sensor data about an entity. For example, the detection module 222 receives images from the camera 233, location information from a GPS sensor 247, and distance information from a lidar sensor 247. The detection module 222 may identify the entity and generate entity data 297 based on the sensor data. The detection module 222 may also determine a position of the entity in a sensor frame, a bounding box of the entity, and a type of entity.

The categorization module 224 assigns 404 the entity to a category. The danger assessment module 226 estimates 406 a danger index for the entity based on vehicle data, category data, and entity data. The danger assessment module 226 may determine whether the danger index exceeds a predetermined threshold probability.

The graphics selection module 228 identifies 408 a graphic that is a representation of the entity. For example, the graphic is a simplified representation of the entity, such as an icon of a car to represent a vehicle. The graphics selection module 228 determines 410 a display modality for the graphic based on the danger index. The graphic may include a more noticeable display modality responsive to an increasing danger index. For example, the modality may include bright colors, be bolded, include a flashing graphic, etc. The modality may be separate from the graphic or be part of the graphic. The scene computation module 230 positions 412 the graphic to correspond to a user's eye frame. The scene computation module 230 may position the graphic at a real position of the entity so that the user maintains a substantially same eye focus when looking at the graphic and the entity. This reduces response time because the user does not have to refocus when switching from looking at the road to the graphic. In some embodiments, the method also includes a heads-up display 231 displaying the graphic as three-dimensional Cartesian coordinates.

The embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments, or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving sensor data describing an entity with a processor-based computing device programmed to perform the receiving;
assigning the entity to a category associated with the entity;
estimating a danger index for the entity based on vehicle data describing a vehicle, category data describing the category, and a position of the entity;
generating entity data that includes the danger index;
identifying a graphic that is a representation of the entity based on the entity data;
determining a display modality for the graphic based on the danger index; and
positioning the graphic to correspond to a user's eye frame, wherein positioning the graphic to correspond to the user's eye frame further includes:
computing a first transformation from a sensor frame to an eye frame;
multiplying the first transformation by a second transformation from graphics to the sensor frame to obtain a third transformation from the graphics to the eye frame; and
projecting the graphics into a viewport placed at a transformation from graphics to an eye frame pose.

2. The method of claim 1, further comprising displaying the graphic as three-dimensional Cartesian coordinates on a heads-up display.

3. The method of claim 1, wherein the graphic is a simplified representation of the entity.

4. The method of claim 1, wherein the graphic is displayed on a heads-up display unit.

5. The method of claim 1, wherein receiving sensor data about an entity further comprises determining a position of the entity in a sensor frame and a bounding box of the entity.

6. The method of claim 1, wherein the vehicle data includes a current or predicted speed of the vehicle and whether the lights are on.

7. The method of claim 1, wherein the category data includes whether the entity is a mobile object.

8. The method of claim 1, wherein estimating the danger index includes determining whether the danger index exceeds a predetermined threshold probability.

9. The method of claim 1, wherein estimating the danger index includes estimating motion associated with the entity based on historical entity data.

10. The method of claim 1, wherein determining the display modality for the graphic further includes determining a more noticeable modality responsive to an increasing danger index.

11. A computer program product comprising a tangible, non-transitory computer-usable medium including a computer-readable program, wherein the computer-readable program when executed on a computer causes the computer to:
receive sensor data describing an entity;
assign the entity to a category associated with the entity;
estimate a danger index for the entity based on vehicle data describing a vehicle, category data describing the category, and a position of the entity;
generate entity data that includes the danger index;
identify a graphic that is a representation of the entity based on the entity data;
determine a display modality for the graphic based on the danger index; and
position the graphic to correspond to a user's eye frame, wherein positioning the graphic to correspond to the user's eye frame further includes:
compute a first transformation from a sensor frame to an eye frame;
multiply the first transformation by a second transformation from graphics to the sensor frame to obtain a third transformation from the graphics to the eye frame; and
project the graphics into a viewport placed at a transformation from graphics to an eye frame pose.

12. The computer program product of claim 11, wherein the computer-readable program is further configured to display the graphic as three-dimensional Cartesian coordinates on a heads-up display.

13. The computer program product of claim 11, wherein the graphic is a simplified representation of the entity.

14. The computer program product of claim 11, wherein the graphic is displayed on a heads-up display unit.

15. The computer program product of claim 11, wherein receiving sensor data about an entity further comprises determining a position of the entity in a sensor frame and a bounding box of the entity.

16. A system comprising:
a processor; and
a non-transitory memory storing instructions that, when executed, cause the system to:
receive sensor data describing an entity;
assign the entity to a category;
estimate a danger index for the entity based on vehicle data describing a vehicle, category data describing the category, and a position of the entity;
generate entity data that includes the danger index;
identify a graphic that is a representation of the entity based on the entity data;
determine a display modality for the graphic based on the danger index; and
position the graphic to correspond to a user's eye frame wherein positioning the graphic to correspond to the user's eye frame further includes causing the system to:
compute a first transformation from a sensor frame to an eye frame;

multiply the first transformation by a second transformation from graphics to the sensor frame to obtain a third transformation from the graphics to the eye frame; and
project the graphics into a viewport placed at a transformation from graphics to an eye frame pose.

17. The system of claim 16, further comprising a heads-up display for displaying the graphic as three-dimensional Cartesian coordinates on a heads-up display.

18. The system of claim 16, wherein the graphic is a simplified representation of the entity.

19. The system of claim 16, wherein the graphic is displayed on a heads-up display unit.

20. The system of claim 16, wherein receiving sensor data about an entity further comprises determining a position of the entity in a sensor frame and a bounding box of the entity.

* * * * *